US011692318B2

(12) United States Patent
Erdtmann

(10) Patent No.: US 11,692,318 B2
(45) Date of Patent: Jul. 4, 2023

(54) CONSTRUCTION MACHINE WITH LIGHTING ARRANGEMENT

(71) Applicant: JOSEPH VOEGELE AG, Ludwigshafen/Rhein (DE)

(72) Inventor: Bernhard Erdtmann, Mannheim (DE)

(73) Assignee: JOSEPH VOEGELE AG, Ludwigshafen/Rhein (DE)

(*) Notice: Subject to any disclaimer, the term of this patent is extended or adjusted under 35 U.S.C. 154(b) by 106 days.

(21) Appl. No.: 17/166,151

(22) Filed: Feb. 3, 2021

(65) Prior Publication Data

US 2021/0237642 A1   Aug. 5, 2021

(30) Foreign Application Priority Data

Feb. 3, 2020  (EP) ..................... 20155127

(51) Int. Cl.
| | | |
|---|---|---|
| *B60Q 1/14* | (2006.01) | |
| *B60Q 1/00* | (2006.01) | |
| *B60Q 1/08* | (2006.01) | |
| *B60Q 1/24* | (2006.01) | |
| *E01C 19/48* | (2006.01) | |

(52) U.S. Cl.
CPC ............. *B60Q 1/14* (2013.01); *B60Q 1/0041* (2013.01); *B60Q 1/085* (2013.01); *B60Q 1/1438* (2013.01); *B60Q 1/24* (2013.01); *E01C 19/48* (2013.01); *B60Q 2200/30* (2013.01); *B60Q 2300/054* (2013.01); *B60Q 2300/14* (2013.01); *E01C 2301/00* (2013.01)

(58) Field of Classification Search
CPC .................................. B60Q 1/14; B60Q 1/085
See application file for complete search history.

(56) References Cited

U.S. PATENT DOCUMENTS

| | | | |
|---|---|---|---|
| 8,890,046 B2 | 11/2014 | Eul et al. | |
| 10,087,588 B2 | 10/2018 | Buschmann et al. | |
| 10,422,500 B2 * | 9/2019 | Na .......................... | B60Q 1/02 |
| 10,822,753 B2 | 11/2020 | Buschmann et al. | |

FOREIGN PATENT DOCUMENTS

| | | | | |
|---|---|---|---|---|
| EP | 2 578 748 A1 | 4/2013 | | |
| EP | 2 698 473 A2 | 2/2014 | | |
| EP | 3 214 223 A1 | 9/2017 | | |
| EP | 3 431 659 A1 | 1/2019 | | |
| EP | 3 214 223 B1 | 5/2019 | | |
| EP | 3650602 A1 * | 5/2020 | ............... | B60Q 1/24 |
| WO | 2019/009349 A1 | 1/2019 | | |

OTHER PUBLICATIONS

European Search Report dated Jul. 1, 2020, Application No. 20155127.2-1002, Applicant Joseph Voegele AG, 6 Pages.

* cited by examiner

*Primary Examiner* — Robert J May
(74) *Attorney, Agent, or Firm* — Brooks Kushman P.C.

(57) ABSTRACT

A construction machine in the form of a road paver or feeder vehicle includes a chassis and a hopper, wherein at least one lighting arrangement is mounted on the chassis. The lighting arrangement comprises at least one light source, and the lighting arrangement is configured to illuminate an area in front of the construction machine in the direction of travel. The construction machine further has an object detection system for detecting an object located in front of the construction machine in the direction of travel, and the illumination emitted by the lighting arrangement can be changed as a function of the detection of an object by means of the object detection system.

18 Claims, 3 Drawing Sheets

CONSTRUCTION MACHINE WITH LIGHTING ARRANGEMENT

CROSS-REFERENCE TO RELATED APPLICATIONS

This application claims foreign priority benefits under 35 U.S.C. § 119(a)-(d) to European patent application number EP 20155127.2, filed Feb. 3, 2020, which is incorporated by reference in its entirety.

TECHNICAL FIELD

The disclosure refers to a construction machine in the form of a road paver or feeder vehicle with a lighting arrangement.

BACKGROUND

A road paver for producing a paving layer from a paving material as well as a feeder vehicle for supplying the road paver with a paving material to be paved each comprise a hopper for storing therein a paving material for their operation. The respective hoppers of the above mentioned self-propelled road construction machines are supplied with the paving material by trucks at the construction site. The delivered paving material is filled from the trucks into the respective hoppers. As disclosed in EP 3 431 659 A1, the road paver or feeder vehicle has a pushing device in front of its respective hopper for the material transfer process, to which said pushing device a truck docks backwards with its rear tires.

Typically, an operator is in a driver's cab provided on the road paver or feeder vehicle during paving. There a main operator control stand with operating elements for controlling the working components of the construction machine is provided. The driving function and secondary functions, such as lighting, can also be controlled from the driver's cab. It is known from EP 3 214 223 B1 that the road paver is equipped with an operating unit with secondary operating elements provided on the side of the chassis or the hopper. The majority of secondary operating elements may include a lighting operating element that can be operated to switch on and/or off at least part of a lighting system of the road paver. If the road paver's lighting system comprises a plurality of lighting elements, a configuration device may be provided to set which lighting elements can be switched on and/or of by operating the lighting operating element. In this way, the lighting operating element can be adapted to the preferences of a particular user or to the specific requirements of a particular job site.

For a truck used on a night job site to deliver paving material to the construction machine, i.e., the road paver or feeder vehicle, the lighting can be problematic as it can hit the rearview mirrors of the truck and dazzle the driver while he is backing up to dock with the construction machine.

SUMMARY

An object of the present disclosure is to provide an improved construction machine in the form of a road paver or feeder vehicle in order to eliminate the above mentioned disadvantage.

This object is solved by a construction machine in the form of a road paver or feeder vehicle according to the disclosure, or by a method for operating a lighting arrangement of a construction machine in the form of a road paver or feeder vehicle according to the disclosure.

A construction machine according to the disclosure in the form of a road paver or feeder vehicle comprises a chassis and a hopper, wherein at least one lighting arrangement is mounted directly or indirectly on the chassis. The lighting arrangement has at least one light source. The lighting arrangement is configured to illuminate an area in front of the construction machine in the direction of travel. The construction machine has an object detection system for detecting an object located in front of the construction machine in the direction of travel, wherein the illumination emitted by the lighting arrangement can be changed by means of the object detection system depending on the detection of an object.

This makes the approach of the truck and docking with the construction machine more user-friendly, as the truck driver is less dazzled and can orientate himself better and more easily. This reduces the effort for the truck driver when reversing the truck towards the construction machine and when docking the truck to the construction machine.

In an efficient embodiment, the illumination emitted by the lighting arrangement can be automatically changed depending on the detection of an object by means of the object detection system. This eliminates the step of manual shutdown for the operator of the construction machine when reversing the truck in the direction of the construction machine and thus reduces the effort.

Preferably, the illumination emitted by the light source is dimmable. This reduces dazzling, but still allows sufficient light to be provided to make the area around the construction site visible in the dark, which is helpful for the driver of the construction machine itself as well as for other construction work.

In one embodiment, the illumination emitted by the light source can be switched off. This enables the driver of the truck to reverse without being dazzled.

In an alternative embodiment, the light source can be rotated in a direction different from the direction of travel. This enables the driver of the truck to reverse without being dazzled.

It may be useful if the lighting arrangement has a cover that is movable relative to the light source and the light source can be at least partially covered by the cover. This enables the driver of the truck to reverse without being dazzled.

It is further proposed that the lighting arrangement comprises a first light source for a near range in the direction of travel in front of the construction machine and a second light source for a far range in the direction of travel in front of the construction machine, wherein the illumination emitted by the first and second light sources can be selectively changed in dependence on the detection of an object by means of the object detection system. This enables e.g., a selective switching off of the light source for the far range if the truck is started backwards in the direction of the construction machine at night and docked to the construction machine, wherein the light source for the near range remains switched on for the visibility of the near surroundings of the construction site.

The disclosure also refers to a method for operating a lighting arrangement of a construction machine in the form of a road paver or feeder vehicle, wherein the construction machine comprises a chassis, wherein at least one lighting arrangement is mounted on the chassis, wherein the lighting arrangement comprises at least one light source, and wherein the lighting arrangement is configured to illuminate an area in front of the construction machine in the direction of travel. The construction machine comprises an object detection system for detecting an object located in front of the construction machine in the direction of travel, wherein, when an object is detected by means of the object detection system, the illumination emitted by the lighting arrangement is automatically changed in dependence on a detection of an object. This improves, as mentioned above, the orientation of the truck driver and simplifies the approach of the truck and docking to the construction machine.

In an efficient embodiment, the method according to the disclosure provides that the illumination emitted by the lighting arrangement is automatically changed depending on the detection of an object by means of the object detection system. This eliminates the step of manual switching off for the operator of the construction machine when reversing the truck in the direction of the construction machine and reduces his effort.

In an advantageous embodiment, the method according to the disclosure provides for the illumination emitted by the light source to be dimmed when an object is detected. This reduces dazzling, but allows sufficient light to be provided to make the area surrounding the construction site visible in the dark, which is helpful for other construction work.

In a further advantageous embodiment, the method according to the disclosure provides that the illumination emitted by the light source is switched off when an object is detected. This enables the driver of the truck to reverse without being dazzled.

In an alternative embodiment, the method according to the disclosure provides that the light source is rotated in a direction deviating from the direction of travel. This enables the driver of the truck to reverse without being dazzled.

In an alternative embodiment, the method according to the disclosure provides that the lighting arrangement has a cover and the light source is at least partially covered by the cover. This enables the driver of the truck to reverse without being dazzled.

In an alternative embodiment, the method according to the disclosure provides that the lighting arrangement comprises a first light source for a close range in the direction of travel in front of the construction machine and a second light source for a far range in the direction of travel in front of the construction machine, wherein the illumination emitted by the first and second light sources is selectively changed in dependence on the detection of an object by means of the object detection system. This enables the light source for the far distance range to be selectively switched off when the truck is reversed in the direction of the construction machine at night and docked to the construction machine, whereby the light source for the near distance range remains switched on for the visibility of the near surroundings of the construction site.

In the following, embodiments of the disclosure are described in more detail using the Figures.

DETAILED DESCRIPTION

Figure 1:
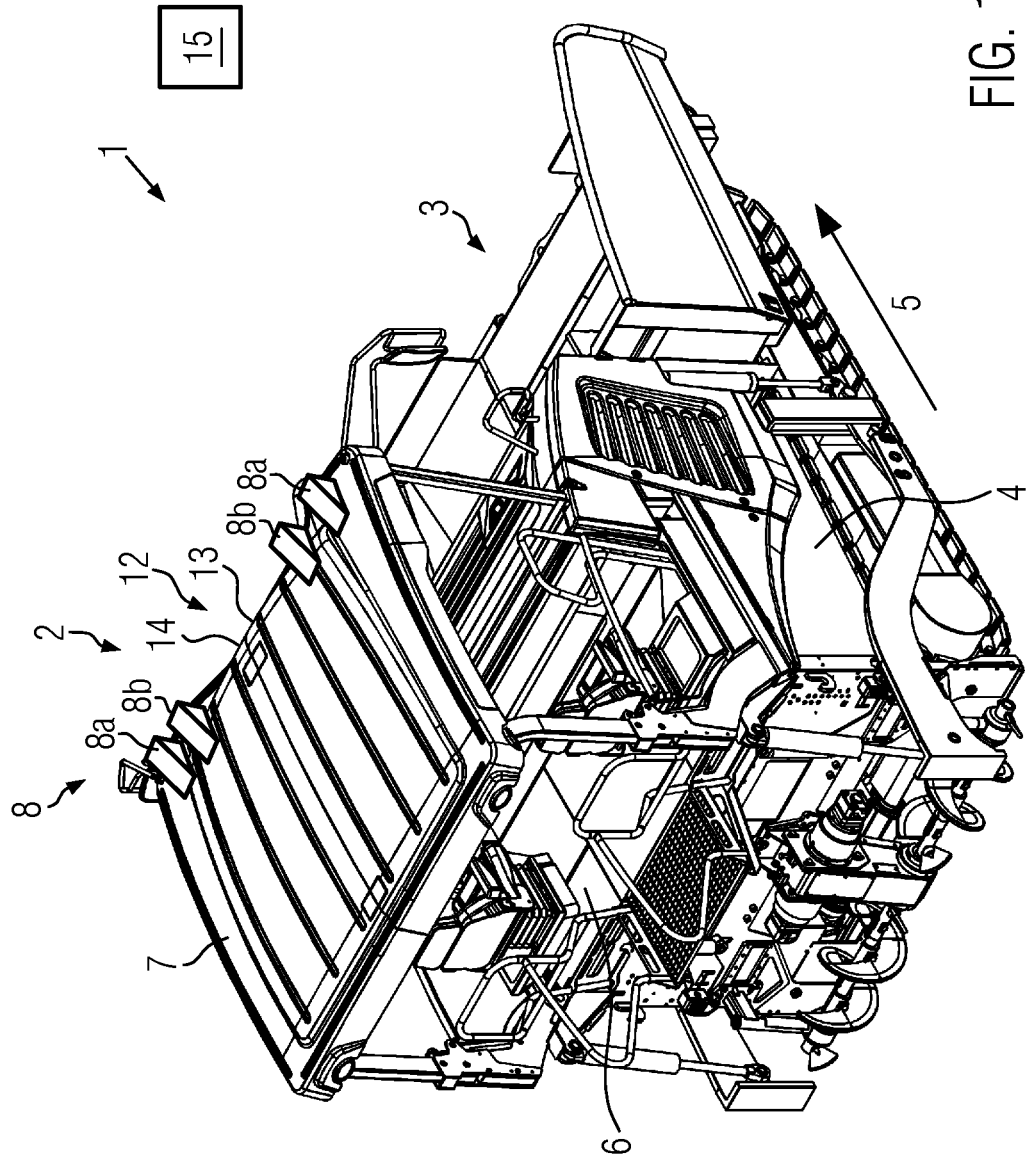
FIG. 1 shows a schematic representation of a construction machine in the form of a road paver.

FIG. 1 shows a construction machine 1 in the form of a road paver 2 for producing a paving layer. The road paver 2 includes a hopper 3, in which a paving material for paving the paving layer is stored. The hopper 3 is arranged on a chassis 4 of the road paver 2 at the front, viewed in direction of travel 5. The road paver 2 further comprises an operator's platform 6 from which an operator can control the road paver 2. A movable screed (not shown) is mounted at the rear of the road paver 2, viewed in direction of travel 5. To this end, the paving material stored in the front of the hopper 3 is transported to the rear of the road paver against the direction of travel 5 by a longitudinal conveyor (not shown), spread out in front of the paving screed and finally compacted by the paving screed to form a new paving layer.

A driver's cab 6 is provided on the chassis 4 of road paver 2, which includes a workplace for an operator of the road paver 2. The driver's cab 6 may include a roof 7 to protect the operator from weather conditions or falling objects.

The road paver 2 has a lighting arrangement 8, which includes at least one light source 8a, 8b. The lighting arrangement 8 is mounted on the roof 7 (and thus indirectly on the chassis 4) in the embodiment shown in FIG. 1. It is also possible to install the lighting arrangement 8 at other locations on the road paver 2. The light source 8a, 8b can be a headlight. In particular, the lighting arrangement 8 can have a far-range light source 8a to illuminate a far range of the surroundings of the road paver 2. In addition, a close-range light source 8b may be provided to illuminate a close range of the surroundings of the road paver 2. In particular, the far-range and close-range light sources 8a, 8b can illuminate a front area in the direction of travel 5 in front of the road paver 2 to facilitate road construction work in darkness.

Figure 2:
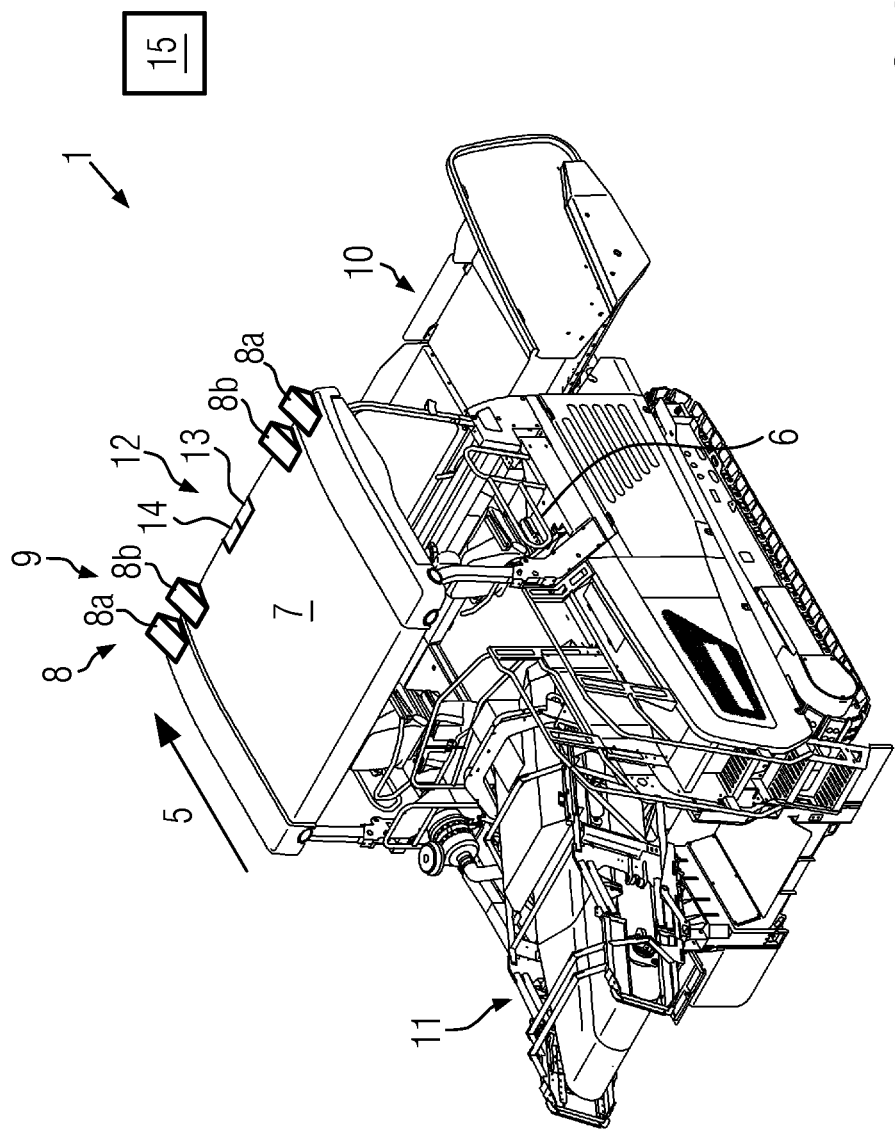
FIG. 2 shows a schematic representation of a construction machine in the form of a feeder vehicle.

FIG. 2 shows a construction machine 1 in the form of a feeder vehicle 9 for supplying a road paver 2 as shown in FIG. 1. The feeder vehicle 9 has a hopper 10 for storing the paving material. The hopper 10 is mounted on a chassis 4 of the feeder vehicle 2 at the front as seen in direction of travel 5. The feeder vehicle 9 is also equipped with a material conveyor 11 adapted to receive the paving material from the hopper 10 and to transfer it to a road paver 2 as shown in FIG. 1. For this purpose, the feeder vehicle 9 travels in front of the road paver 2, while the material conveyor 11 conveys the paving material into the hopper 3 of the road paver 2.

A driver's cab 6 is provided on the chassis 4 of the feeder vehicle 9, which includes a workstation for an operator of feeder vehicle 9. The driver's cab 6 can include a roof 7 to protect the operator from weather conditions or falling objects.

The feeder vehicle 9 has a lighting arrangement 8, which includes at least one light source 8a, 8b. The light source 8a, 8b can be a headlamp. In particular, the lighting arrangement 8 can have a far-range light source 8a to illuminate a far range around the feeder vehicle 9. In addition, a close-range light source 8b may be provided to illuminate a close range of the surroundings of the feeder vehicle 9. In particular, the far- and close-range light sources 8a, 8b can illuminate a front area in the direction of travel 5 in front of the feeder vehicle 9 to facilitate road construction work in the dark.

As shown in FIGS. 1 and 2, the road paver 2 and the feeder vehicle 9 are equipped with an object detection system 12. The object detection system 12 may include a camera 13 and/or a sensor arrangement 14 for object detection 15. The sensor arrangement 14 may include ultrasonic acoustic sensors and/or radar sensors and/or infrared sensors and/or lidar sensors. The camera 13 or the sensor arrangement 14 can detect an object 15 in the area in front of the construction machine 1 and generate a signal when the object 15 is detected and depending on its size. The detection of the object 15 in the form of a truck can be carried out depending on the size of the object 15. The sensors can be able to detect the size of object 15. The detection of object 15 in the form of a truck can also be performed by image processing of the images captured by the camera. A computer (not shown) can receive and process the signal from camera 13 or sensor arrangement 14. The computer can also transmit the processed signal to the lighting arrangement 8 for automatic switching off or dimming of the illumination emitted by the lighting arrangement 8, in particular by the far-range light source 8*b*. It is also possible that the processed signal can be transmitted to a loudspeaker system (not shown). The loudspeaker system can then receive the processed signal from the computer and transmit it acoustically via an audio system. The operator can then manually dim or switch off the lighting emitted by light source 8, especially the far-range light source 8*b*.

Figure 3:
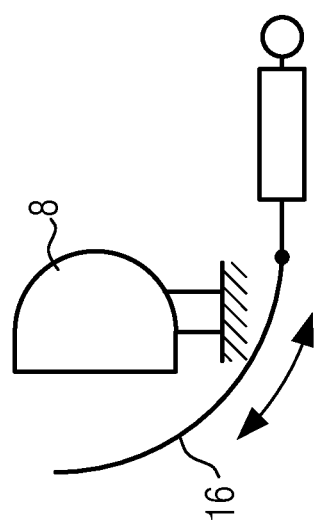
FIG. 3 shows a light source of the construction machine with a cover.

FIG. 3 shows a variant of the illumination arrangement 8, which has a cover 16 movable relative to the light source 8*a*, 8*b*. The cover can partially or completely cover the light source 8*a*, 8*b*. If an object 15 is detected by means of the object detection system 12, the cover 16 can be moved automatically to such a position, if necessary, to avoid dazzling a truck driver.

Figure 4:
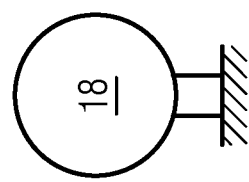
FIG. 4 shows a rotatably mounted lighting arrangement.

The lighting assembly 8 can also be mounted in a rotating manner. This is shown in FIG. 4. The position of lighting arrangement 8 rotated in the direction of travel 5 of the feeder vehicle 9 or the road paver 2 is marked "17". The position of lighting arrangement 8 turned away from the direction of travel 5 of the feeder vehicle 9 or the road paver 2 is marked "18". With such a configuration, if an object 15 is detected in front of the construction machine 1 by the object detection system 12, one or more (e.g., all) of the light sources 8*a*, 8*b* of the lighting arrangement 8 may each be automatically rotated from a position aligned with the direction of travel 5 (e.g., a position facing in the direction of travel 5) to a position that deviates from the direction of travel 5 (e.g., a position turned away from the direction of travel 5).

What is claimed is:

1. A construction machine in the form of a road paver or feeder vehicle, the construction machine comprising:
    a chassis;
    a hopper arranged on the chassis;
    a lighting arrangement mounted on the chassis, wherein the lighting arrangement comprises a light source, and wherein the lighting arrangement is configured to illuminate an area in front of the construction machine in a direction of travel; and
    an object detection system for detecting an object located in front of the construction machine in the direction of travel, wherein illumination emitted by the lighting arrangement can be changed by the object detection system as a function of a detection of an object,
    wherein the light source comprises a first light source for a near range in the direction of travel in front of the construction machine, and the lighting arrangement further comprises a second light source for a far range in the direction of travel in front of the construction machine, and wherein lighting emitted from the first and second light sources is selectively variable in dependence on a detection of an object by the object detection system.

2. The construction machine according to claim 1, wherein the illumination emitted by the lighting arrangement is automatically variable in dependence on the detection of an object by the object detection system.

3. The construction machine according to claim 1, wherein the illumination emitted by the lighting arrangement is dimmable.

4. The construction machine according to claim 1, wherein lighting emitted by the light source can be switched off.

5. The construction machine according to claim 1, wherein the light source is rotatable in a direction deviating from the direction of travel.

6. The construction machine according to claim 1, wherein the lighting arrangement comprises a cover movable relative to the light source, and the light source can be at least partially covered by the cover.

7. A method for operating a lighting arrangement of a construction machine in the form of a road paver or feeder vehicle, wherein the construction machine has a chassis, a hopper, and a lighting arrangement mounted on the chassis, wherein the lighting arrangement comprises a light source, and wherein the lighting arrangement is configured to illuminate an area in front of the construction machine in a direction of travel, the method comprising:
    detecting, by an object detection system of the construction machine, an object located in front of the construction machine in the direction of travel; and
    changing illumination emitted by the lighting arrangement as a function of the detection of the object,
    wherein the light source comprises a first light source for a near range in the direction of travel in front of the construction machine, and the lighting arrangement further comprises a second light source for a far range in the direction of travel in front of the construction machine, and wherein changing the illumination emitted by the lighting arrangement comprises selectively changing illumination emitted by the first and second light sources in dependence on the detection of the object by the object detection system.

8. The method according to claim 7, wherein the illumination emitted by the lighting arrangement is automatically changed in dependence on the detection of the object.

9. The method according to claim 7, wherein changing the illumination emitted by the lighting arrangement comprises dimming illumination emitted by the light source.

10. The method according to claim 7, wherein changing the illumination emitted by the lighting arrangement comprises switching off illumination emitted by the light source.

11. The method according to claim 7, wherein the light source is rotated in a direction deviating from the direction of travel.

12. The method according to claim 7, wherein changing the illumination emitted by the lighting arrangement comprises rotating the light source to a position turned away from the direction of travel.

13. The method according to claim 7, wherein the lighting arrangement comprises a cover, and wherein changing the illumination emitted by the lighting arrangement comprises at least partially covering the light source by the cover.

14. The method according to claim 7, wherein the lighting arrangement comprises a rotatable cover, and wherein changing the illumination emitted by the lighting arrangement comprises rotating the cover to at least partially cover the light source.

15. The construction machine according to claim 1, wherein the construction machine is operable to automatically switch off or dim the second light source based on the detection of the object by the object detection system.

16. The construction machine according to claim 15, wherein the construction machine is operable to automatically switch off the second light source based on the detection of the object by the object detection system.

17. The method according to claim 7, wherein selectively changing the illumination emitted by the first and second light sources comprises automatically switching off or dimming the second light source based on the detection of the object by the object detection system.

18. The method according to claim 17, wherein selectively changing the illumination emitted by the first and second light sources comprises automatically switching off the second light source based on the detection of the object by the object detection system.

\* \* \* \* \*